United States Patent

[11] 3,523,554

[72] Inventor  Dante Straulino
              Lautaro 1081, Buenos Aires, Argentina
[21] Appl. No. 600,527
[22] Filed     Dec. 9, 1966
[45] Patented  Aug. 11, 1970

[54] THREE DUCT JUNCTION FOR DISTRIBUTING FLOWING AIR
     4 Claims, 7 Drawing Figs.
[52] U.S. Cl. .................................................. 137/625.4, 251/298
[51] Int. Cl. .................................................. F16k 1/16, F16k 3/00, 13/00
[50] Field of Search ....................................... 137/625.4; 251/Curtain Values; 137/607, 609, 596, 610, 625.46; 251/301, 298, 299, 212

[56]            References Cited
              UNITED STATES PATENTS

| | | | |
|---|---|---|---|
| 763,724   | 6/1904  | Collis    | 137/625.46 |
| 806,268   | 12/1905 | Koontz    | 137/610    |
| 1,066,978 | 7/1913  | Babbitt   | 251/301X   |
| 2,891,576 | 6/1959  | Kennedy   | 137/607X   |
| 3,380,475 | 4/1968  | Armstrong | 251/301X   |

*Primary Examiner*— Henry T. Klinksiek
*Attorney*— Otto John Munz

ABSTRACT: In a three duct junction for distributing flowing air alternatively to either of two openings provided therein by means of two sliding doors and two sliding screens, which slide over the face of said openings. Both said doors and said screens closing upon each other alternately by reason of a multiple rack and pinion arrangement, one each for the respective doors and screens, and a rail arrangement for guiding said sliding parts.

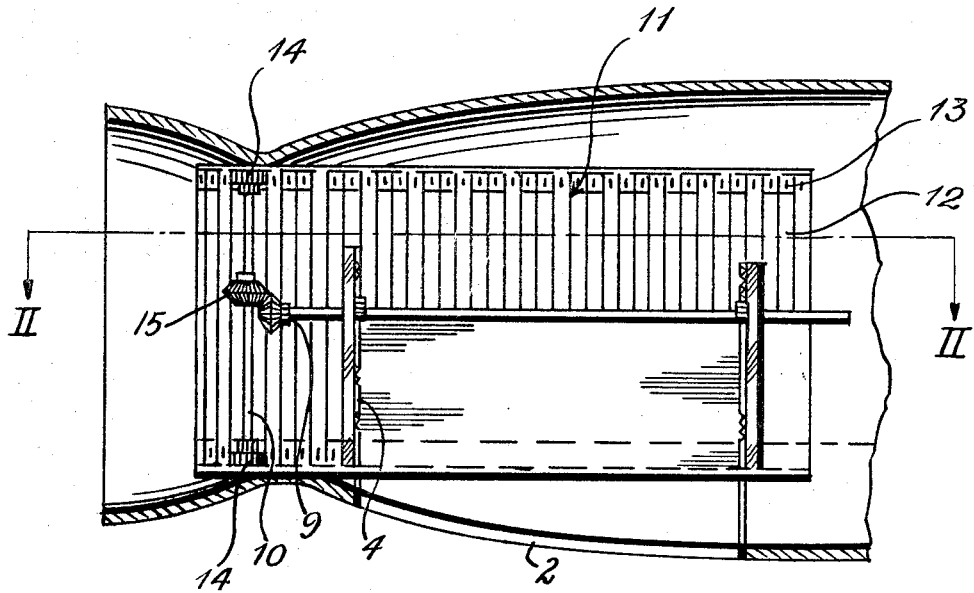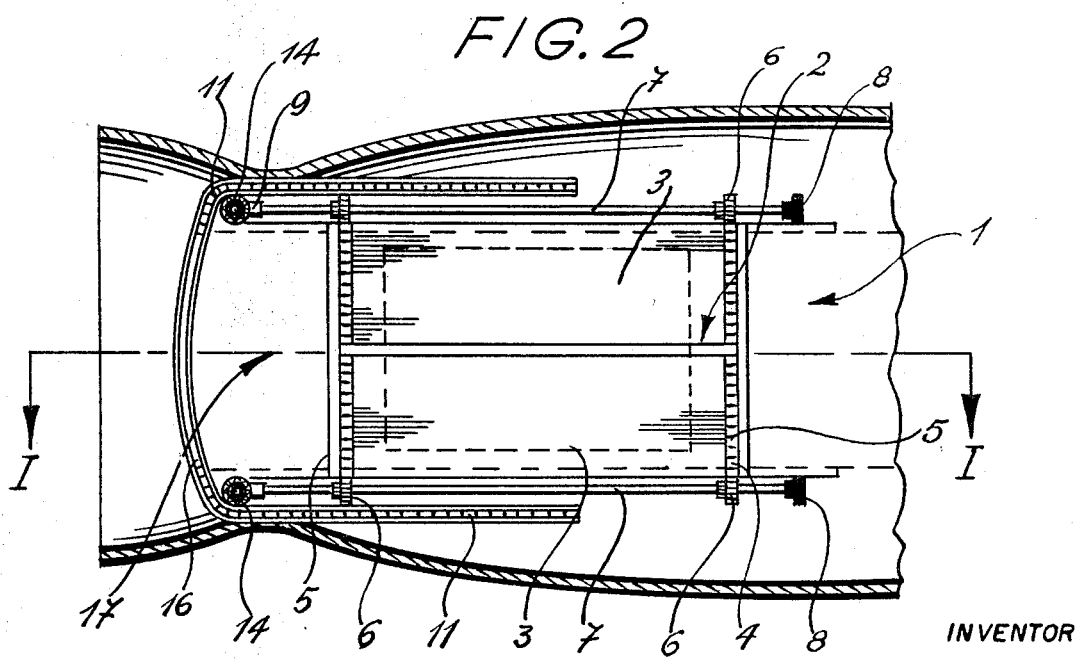

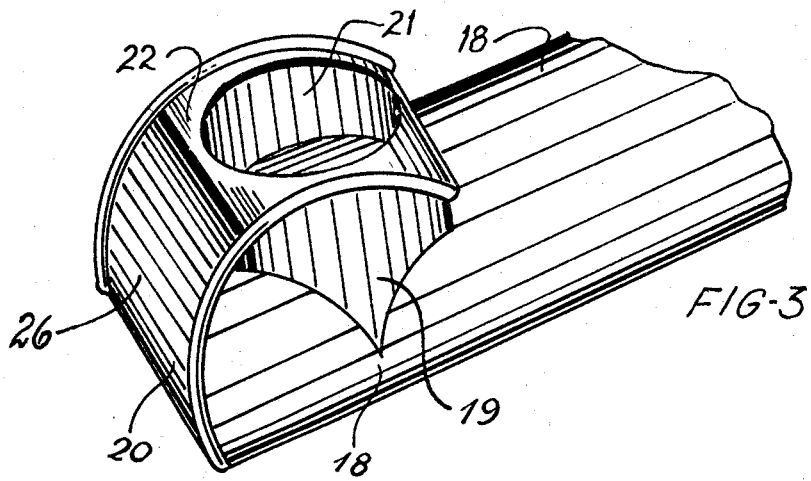
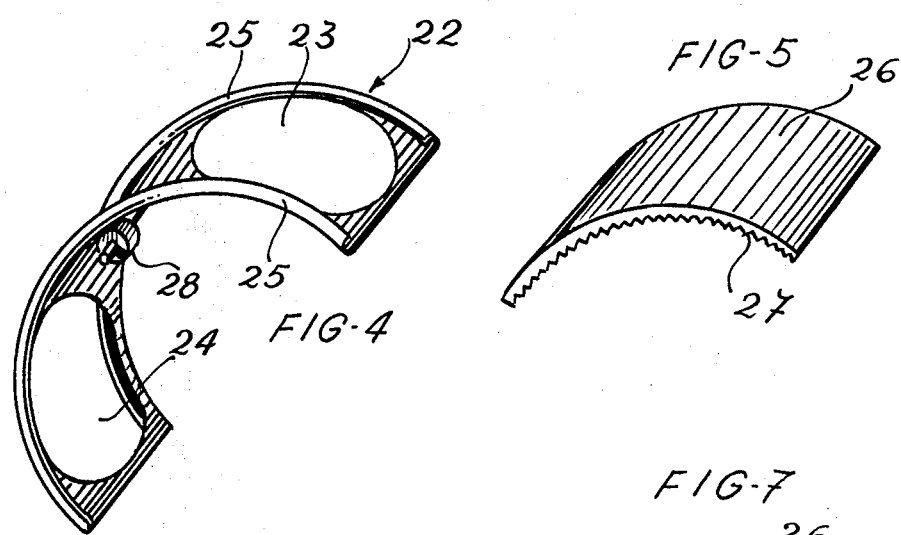
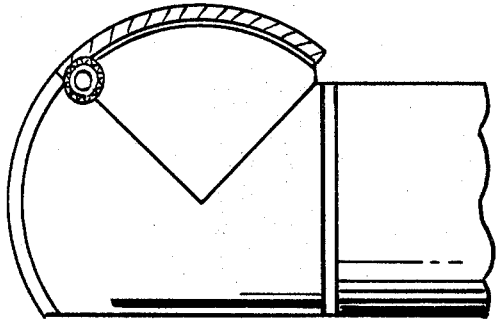
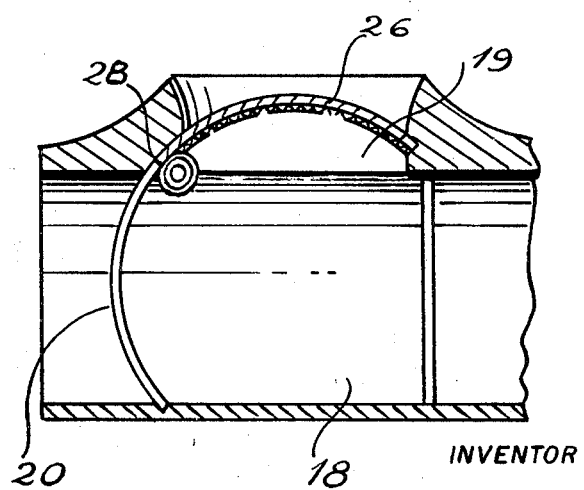

3,523,554

THREE DUCT JUNCTION FOR DISTRIBUTING FLOWING AIR

The present invention deals with improvements in air ducting.

An object of the invention is to provide a novel system to distribute air at a three duct junction.

The invention is characterized by the use of rail systems, whereby closing pieces may be alternately slid into and out of closing position before one of two ducts.

In the drawings:

FIGURE 1 represents a longitudinal section of the junction along the line I-I of FIGURE 2.

FIGURE 2 represents a section of the junction along the line II-II of FIGURE 1.

FIGURE 3 is a perspective view of a variant of the invention.

FIGURES 4 and 5 are detail views of parts of the variant of FIGURE 3.

FIGURE 6 is a detail view of the location of FIGURE 5.

FIGURE 7 is a side section of FIGURE 3. The junction of FIGURES 1 and 2 mainly consists of a cylindrical conduit 1 with a rectangular hole 2 made in its lower side. On both sides of hole 2 and transversely to the main axis of cylindrical conduit 1, there are arranged two curved and mutually facing U-section rails 5 on which slide the seal half-doors 3 which, when touching seal the hole 2. Since the half-doors 3 are shown substantially closing hole 2 in FIGURES 1 and 2, the hole 2 is illustrated by dashed lines in FIGURE 2. These half-doors 3 are each driven by two gears 6 sustained by an axis 7, one of whose ends is fixed at the butt 8, the other finishing in a gear 9. The set of gears 6 acts directly on the racks 4 of the half-doors 3.

The mouth 17 is of circular section and its sealing system consists of screen 11 formed by an aggregate of mutually jointed laths 12. This sealing screen 11 slides on two opposing rails 16 in such a way that, to allow the entry of air through the mouth 17, each of the two sections forming the same may slide back on the rails 16, thereby locating themselves parallel to the cylindrical conduit. The sections of the screen are driven by means of gears 14 fixed to axis 10, which in turn is driven by gear 15, which is in contact with gear 9.

The sliding of the two sections of screen 11 is due to the motion of gears 14 when these engage the teeth 13, located on the inside ends of laths 12 in the style of a rack.

By operating all this aggregate formed with the axes and gears above mentioned by means of drives (not illustrated), both half-doors move at the same time, so that, when they open the screen 11 seals and vice versa.

Another variant of the junction is that shown in FIGURE 3, and mainly consists of two cylindrical conduits 18 and 19. Conduit 19 is arranged perpendicular to conduit 18.

Curved plate 22 contains two holes 23 and 24 in coincidence with the mouths 20 and 21 of conduits 18 and 19 respectively, and an equal number of rails 25 situated upwards from its main body. The rails 25 extend between the holes 23 and 24, laterally thereto. A hatch 26 slides on the rails of the curved plate 22. Both plate 22 and hatch 26 are of circular arc to facilitate this sliding. The said hatch 26 contains on both side borders and on its lower face an equal number of indented zones 27, which engage with the gears 28. The gears 28 are journalled in openings (not represented) of the curved plate 22. When the said gears 28 revolve, hatch 26 starts moving in such a way that it seals one entry mouth and frees the other one and vice versa.

I claim:

1. A duct junction, comprising a conduit extending to a mouth, the conduit having a hole in its side, a pair of screens, a pair of half-doors, and means connected to the conduit to close the screens across the mouth while opening the half-doors from closure across the hole and to close the half-doors across the hole while opening the screen from closure across the mouth.

2. A duct junction as claimed in Claim 1, said screen comprising two sections of jointed laths, said means including rails extending from positions parallel to the conduit into positions across the mouth, the laths slidably mounted at their ends in the rails one section on one side of the mouth, one section on the opposite side of the mouth.

3. A duct junction, comprising a conduit, a conduit connected to and opening into conduit, the two conduits having mouths spaced away from the point of connection of the two conduits, a curved plate extending between the mouths, holes of the curved plate coinciding with the mouths, rails of the curved plate extending between the holes and situated laterally to the holes and a hatch slidably mounted in the rails, whereby the hatch may be moved to seal mouth while freeing mouth and vice versa.

4. A duct junction as claimed in Claim 3, said hatch having indented zones whereby gear means may be used to move the hatch between the mouths.